US008982091B1

(12) United States Patent
Mohindra (10) Patent No.: US 8,982,091 B1
(45) Date of Patent: Mar. 17, 2015

(54) HADAMARD MATRIX BASED PROJECTED MUTUAL CAPACITANCE TOUCH PANEL DECODING

(75) Inventor: Rishi Mohindra, Milpitas, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 150 days.

(21) Appl. No.: 13/480,357

(22) Filed: May 24, 2012

(51) Int. Cl.
*G06F 3/045* (2006.01)
*G06F 3/041* (2006.01)
*G06F 3/044* (2006.01)
*G06F 3/046* (2006.01)
*G06F 3/0488* (2013.01)

(52) U.S. Cl.
CPC .............. *G06F 3/044* (2013.01); *G06F 3/0416* (2013.01); *G06F 3/046* (2013.01); *G06F 3/0488* (2013.01); *G06F 3/045* (2013.01)
USPC .......................................... 345/174; 345/173

(58) Field of Classification Search
None
See application file for complete search history.

(56) References Cited

U.S. PATENT DOCUMENTS

| 8,436,833 | B2 * | 5/2013 | King et al. .................... 345/175 |
|---|---|---|---|
| 2009/0009483 | A1 | 1/2009 | Hotelling |
| 2010/0059295 | A1 * | 3/2010 | Hotelling et al. .......... 178/18.06 |
| 2010/0060589 | A1 | 3/2010 | Wilson |
| 2010/0060591 | A1 * | 3/2010 | Yousefpor et al. ............ 345/173 |
| 2010/0060593 | A1 | 3/2010 | Krah |
| 2011/0074732 | A1 * | 3/2011 | Reynolds ....................... 345/174 |
| 2011/0234508 | A1 * | 9/2011 | Oda et al. ...................... 345/173 |
| 2012/0056841 | A1 * | 3/2012 | Krenik et al. .................. 345/174 |
| 2012/0146940 | A1 * | 6/2012 | Yamamoto et al. ........... 345/174 |

OTHER PUBLICATIONS

U.S. Appl. No. 13/480,414, filed May 24, 2012 entitled "Digital Filtering and Spread Spectrum Based Interference Mitigation for Mutual and Self Capacitance Panel".
U.S. Appl. No. 13/480,395, filed May 24, 2012 entitled "Mutual Capacitance Large Panel Phase Shift Mitigation".

* cited by examiner

*Primary Examiner* — Jason Olson
*Assistant Examiner* — Stephen T Reed
(74) *Attorney, Agent, or Firm* — Advent, LLP (57) ABSTRACT

Systems for and methods of decoding the coordinates a touch upon a touch panel. The touch panel comprises drive channels and sense channels. A Hadamard excitation matrix and a cover code are used to generate drive signals to the drive channels of the touch panel. Sense channels of the touch panel are demodulated and decoded using an inverse excitation matrix. The inverse of an Hadamard excitation matrix is the same as the Hadamard excitation matrix. A Hadamard excitation matrix is orthogonal and enables the use of cyclic extension of excitation of the drive signals to reduce the effect of phase shift of drive signals propagated to the sense channels. The cover code enables reduction of the dynamic range of amplifiers at the sense channels.

29 Claims, 7 Drawing Sheets

HADAMARD MATRIX BASED PROJECTED MUTUAL CAPACITANCE TOUCH PANEL DECODING

RELATED APPLICATIONS

United States Non-provisional patent application, U.S. patent application Ser. No. 13/480,395, filed on the same date as this application, filed by inventor Rishi Mohindra, and titled, "MUTUAL CAPACITANCE LARGE PANEL PHASE SHIFT MITIGATION", is hereby incorporated by reference for all purposes.

FIELD OF THE INVENTION

The present invention relates to touch panel displays. More specifically, the present invention relates to systems for and methods of efficiently decoding the location of a touch upon a mutual capacitance touch panel using a Hadamard matrix.

BACKGROUND OF THE INVENTION

Many modern electronic devices incorporate a touch panel to display information and to receive input that is activated by touching the display. A mutual capacitance touch panel typically comprises a capacitive sensing medium having a plurality of row traces and a plurality of column traces. The row traces are termed drive channels and the column traces are sense channels and are typically arranged in a rectangular grid pattern forming an X-Y coordinate system. A voltage is stimulated on the drive channels, and a voltage is measured at each sense channel. Each intersection of drive channel and sense channel represents a capacitive sensing node. Since the human body is an electrical conductor, when a finger actuates the touch panel, such as by touching or even getting very close to its surface, the electrostatic field of the touch panel is distorted, resulting in a measurable change in capacitance.

A touch panel controller decodes the coordinates of a touch upon the touch panel by repetitively scanning the touch panel sense channels in response to stimulation of the drive channels in accordance with an excitation matrix, E. The excitation matrix, E, is a square matrix of order M, where M is the number of drive channels (rows). A touch panel has N sense channels (columns), and typically M is greater than N. An example is a touch panel having 20 drive channels, M, and having 15 sense channels, N. An output voltage is measured at each sense channel. The sense channel output voltages are stored as a vector Y, having order M. For M>N, the values of $Y_{N+1} \ldots Y_M$ are able to be zero. To decode the coordinates of a touch based upon capacitance at an intersection of a drive channel and a sense channel, a vector of capacitances, X, is determined from the sense channel voltages, Y, and the excitation matrix, E. X is also a vector of order M. X, Y, and E are related by the following equation (1).

$$E*X=Y \quad (1)$$

To find the vector of capacitances, X, the inverse of the excitation matrix, E, indicated by $E^{-1}$, is multiplied by the vector of sense channel voltages, Y, as shown in the following equation (2).

$$X=E^{-1}*Y \quad (2)$$

To implement the above equations in a touch panel controller, (1) a suitable excitation matrix, E, needs to be determined, (2) wherein E is invertible, (3) E preferably has a low, non-zero condition number, and (4) the variance in output voltage produced by the channels, using E as the excitation matrix, is minimized when no touch is upon the touch panel.

E is invertible if the condition number of E is greater than zero. A matrix with a condition number that is close to one is termed "well-conditioned", meaning that its inverse can be computed with good accuracy. In practice, an excitation matrix have a condition number of two, or less than two, is sufficiently well-conditioned for touch panel decoding. A matrix with a condition number greater than one is non-orthogonal. Generally, the excitation matrix in the prior art will not have a condition number lower than two. Thus, the prior art teaches that the excitation matrix will not be orthogonal. Non-orthogonal excitation is sensitive to phase shifts that cause inter-code interference. The phase shifting is due to delay in propagation of voltages from the drive channels to the sense channels. Further, as the condition number of the excitation matrix increases, the signal-to-noise ratio on the drive and sense channels deteriorates. A poor signal-to-noise ratio at the column sense channels requires more dynamic range in amplifiers at the column sense channels and greater precision in the analog-to-digital convertors receiving the output of each amplifier. It is preferable to have a design with high a signal-to-noise ratio thereby enabling the use of smaller, less expensive, amplifiers with a lower dynamic range. It is also preferable to use an orthogonal excitation matrix to reduce inter-code interference due to phase shifts.

One way to find a suitable excitation matrix, E, meeting the above criteria, is to do an exhaustive search using a computational tool such as a MATLAB™ computational tool. Assuming an example touch panel having twenty (20) rows, an exhaustive search would require searching $2^{40}$ potential excitation matrices to find the optimal excitation matrix in the solution space. Using current technology, an exhaustive search for an excitation matrix meeting the above criteria is computationally too lengthy to be practical.

Another way to find a suitable excitation matrix, E, is to take a sample of potential Es to find an E meeting the above criteria. The matrix, E, selected from the sample will be invertible and have the lowest condition number of the E's sampled. However, there is no assurance that the selected matrix, E, has the lowest possible condition number of all potential Es and therefore may be sub-optimal.

Additionally, a selected excitation matrix, E, in the prior art will typically have real-valued coefficients requiring that the touch panel controller store all of the M×N real-valued coefficients, increasing the storage requirements for the touch panel controller. Further, to decode the coordinates of a touch upon the touch panel, the touch panel controller will need to performed numerous floating-point calculations, increasing the cost, size, heat produced, and storage required to implement a touch panel controller on an integrated circuit. Floating-point calculations also increase the computation time to decode the panel, thereby limiting the available scan rate for decoding touches upon the panel.

As the size of touch panels increase to meet new market needs, such as for larger tablet PC's, the difficulty of finding a suitable excitation matrix increases exponentially. In addition, the problem of phase shift increases due the larger panel having longer signal path lengths that introduce greater drive signal propagation delay.

SUMMARY OF THE INVENTION

A suitable excitation matrix, E, for decoding a touch upon a touch panel can be found by using a Hadamard matrix. A Hadamard matrix is a square matrix order 1, 2, or 4k for k≥1 and whose coefficients are either +1 or −1. A Hadamard matrix is an orthogonal matrix, has a condition number of one, and is invertible. For a Hadamard excitation matrix, E, the inverse excitation matrix, $E^{-1}$, is the matrix E. Hadamard matrices of order 20 are known and suitable for use with a current touch panels having 18 rows. Hadamard matrices of order 64 are also known and suitable for use with a large touch panel having 60 rows. Thus, by using a Hadamard excitation matrix, a suitable excitation matrix can be determined without the need for an exhaustive search.

A Hadamard excitation matrix also produces an optimal, high signal-to-noise ratio in the drive and sense channels because the condition number of the Hadamard excitation matrix is one. The orthogonality of the Hadamard excitation matrix reduces inter-code interference. In addition, since the coefficients of a Hadamard decoding matrix, $E^{-1}$, are always +1 or −1, each coefficient in the Hadamard excitation matrix can be encoded as a single bit, thereby saving substantial storage space and matrix computation resources.

Using a Hadamard excitation matrix, E, the output at the sense channels may not be constant across all sense channels when no touch is present upon the touch panel. A constant vector, termed a cover code in this document, can be used to minimize variance between the column sense channel outputs. To further reduce the variance between the output voltages at column sense channels, the cover code can be a N×N matrix, CC, wherein each column of the cover code is dot-multiplied by the corresponding column of the excitation matrix E before driving the drive channels of the touch panel. To even further reduce the variance between output sense channels, an Offset Cancellation Code comprising a coefficient for each output sense channel, can generate an offset voltage. To reduce the variance to near zero, a time varying Offset Cancellation Code can be used to generate an offset at each column sense output for each drive channel time interval, i, of the excitation matrix, E, thereby bringing the variance between all sense channel voltages to substantially zero when no touch is present upon the touch panel. The dynamic range required for low noise amplifiers (LNAs) at the sense channels, and associated analog-to-digital convertors receiving the output of the LNAs, can be reduced over the prior art. Using the presently-claimed invention, a touch panel controller can be made that is smaller, uses less power, generates less heat, and has a lower cost over the prior art.

In a first aspect, a method of decoding a touch upon a touch panel, by a touch panel decoding circuit coupled to the touch panel, the touch panel comprising M drive channels and N sense channels, the method comprising a scan of the touch panel, a scan comprising the steps, for each column $C_i$ of an excitation matrix E, and i=1 to N: driving the M drive channels with M drive signals generated by the product of $C_i$ and a cover code having at least M coefficients; and receiving and demodulating the N sense channels to form an M×N matrix of touch panel decoding data, wherein the demodulating is performed using the inverse matrix, $E^{-1}$, of the excitation matrix, E. In a preferred embodiment, the cover code comprises an M×M matrix and the M drive signals are generated by the product of $C_i$ and a corresponding column of the cover code matrix, $CC_i$. In another preferred embodiment, after performing the above scan, steps (a) and (b) are further performed using column $C_1$ prior to beginning a next scan in accordance with the method. The coefficients of the excitation matrix, E, each preferably have a value that is one of −1, +1, and 0. In some embodiments, the columns of the excitation matrix each encoded as a selectable binary value. In such embodiments, the cover code is able to also be encoded as a binary value, such that computing the computing the product of a column, $C_i$, of the excitation matrix, and the cover code, comprises performing a logical AND of the column $C_i$ and the cover code. In a preferred embodiment, the excitation matrix, E, is orthogonal. In another preferred embodiment, the excitation matrix, E, is a Hadamard matrix such that the order of E is greater than or equal to the larger of M and N. The cover code is able to be a matrix, CC, having M rows and N columns. Generating the product of the $i^{th}$ column, $C_i$, of the excitation matrix, E, and a cover code comprises generating the product of $C_i$ and the column, $CC_i$, of the cover code matrix. The coefficients of the cover code are able to be one of −1, +1, and 0 such that the cover code can be encoded as a single binary value. In other embodiments, the M coefficients of the cover code are real-valued, complex-valued, or a combination thereof. In some embodiments, the method further comprises injecting an offset voltage to the output of each sense channel such that the variance between the voltage outputs at all sense channels is minimized when no touch is made upon the touch panel. Injecting an offset voltage to the output of each sense channel is able to comprise injecting a voltage that varies with the selection of the $i^{th}$ excitation matrix column $C_i$. Injecting an offset voltage is able to comprise injecting the offset voltage at a point after a sense channel amplifier and before a sense channel integrator. Injecting an offset voltage is able to comprise injecting a constant voltage for all sense channels.

In a second aspect, a touch panel decoding circuit is configured to be coupled to a touch panel, the touch panel having M drive channels and N sense channels. The decoding circuit comprises an invertible excitation matrix, E, comprising at least N selectable columns, $C_i$, i=1 to N, each having at least M coefficients; and a cover code configured to be logically coupled to a selected one of the at least N selectable columns of the excitation matrix, E. The cover code comprises a vector having at least M coefficients, such that a product of the selected column and the cover code is configured to provide a drive signal to each of the M drive channels. The coefficients of the excitation matrix, E, are able to each have a value that is one of −1, +1, and 0. In a preferred embodiment, the excitation matrix, E, is orthogonal. In another preferred embodiment, the excitation matrix E is a Hadamard matrix of order greater than or equal to the larger of M and N. In some embodiments, the circuit further comprises a decoding matrix, $E^{-1}$, and the decoding matrix $E^{-1}$ is the same as the excitation matrix E. In a preferred embodiment, only one instance of the excitation matrix E is encoded in the touch panel decoding circuit, and the one instance is also used as the decoding matrix, $E^{-1}$. The cover code is able to be a matrix, CC, having M rows and N columns, and the product of the selected column, $C_i$, and the cover code comprises the product of $C_i$ and the $i^{th}$ column, $CC_i$, of the cover code matrix. The coefficients of the cover code are able to be real-valued, complex-valued, or a combination thereof. In some embodiments, the coefficients of the cover code each have a value that is one of −1, +1, and 0. In a preferred embodiment, the touch panel decoding further comprises a memory wherein each column, $C_i$, of the at least N columns of the excitation matrix E is encoded as a binary value in the memory. In some embodiments, the touch panel decoding circuit further comprises a voltage injection circuit coupled to the output of each sense channel such that the variance between the voltage outputs at all sense channels is minimized when no touch is made upon the touch panel. The voltage injection circuit is able to be coupled to the output of each sense channel at a point after an amplifier and before an integrator. Injecting an offset voltage is able to comprise injecting a constant voltage for all sense channels. In a preferred embodiment, the touch panel decoding circuit further comprises mixing each of the M drive signals with a shaping pulse.

The following description of embodiments of the presently-claimed invention are exemplary and not to be read as limiting.

DETAILED DESCRIPTION OF THE DRAWINGS

The following embodiments are intended to illustrate the features of the presently-claimed invention. The invention is not limited to only the disclosed embodiments. Throughout the figures, below, identical labels refer to identical or similar elements.

Figure 1:
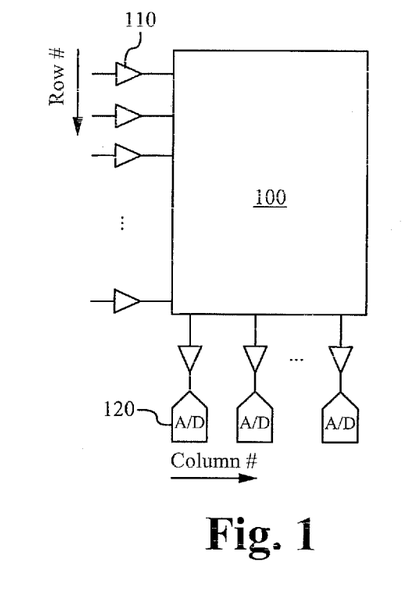
FIG. 1 illustrates a touch panel in portrait mode as is known in the art.
Figure 2:
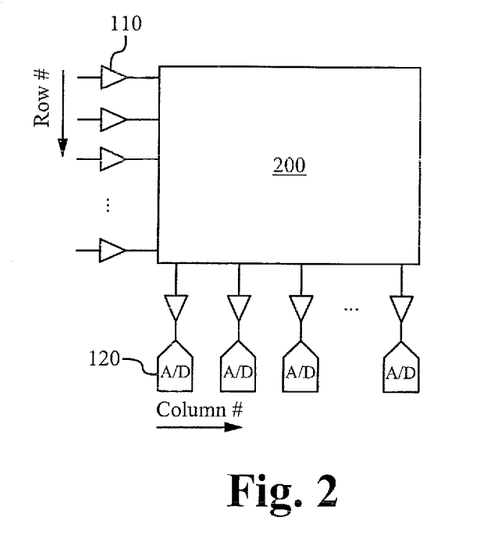
FIG. 2 illustrates a touch panel in landscape mode as is known in the art.

FIG. 1 illustrates a touch panel 100 in portrait mode as is known in the art. An amplifier 110 amplifies a drive signal for each row of the touch panel 100. Rows are driven simultaneously and a each column is amplified and read by an analog to digital convertor 120. FIG. 2 illustrates an analogous touch panel 200 in landscape mode as is known in the art.

Figure 3:
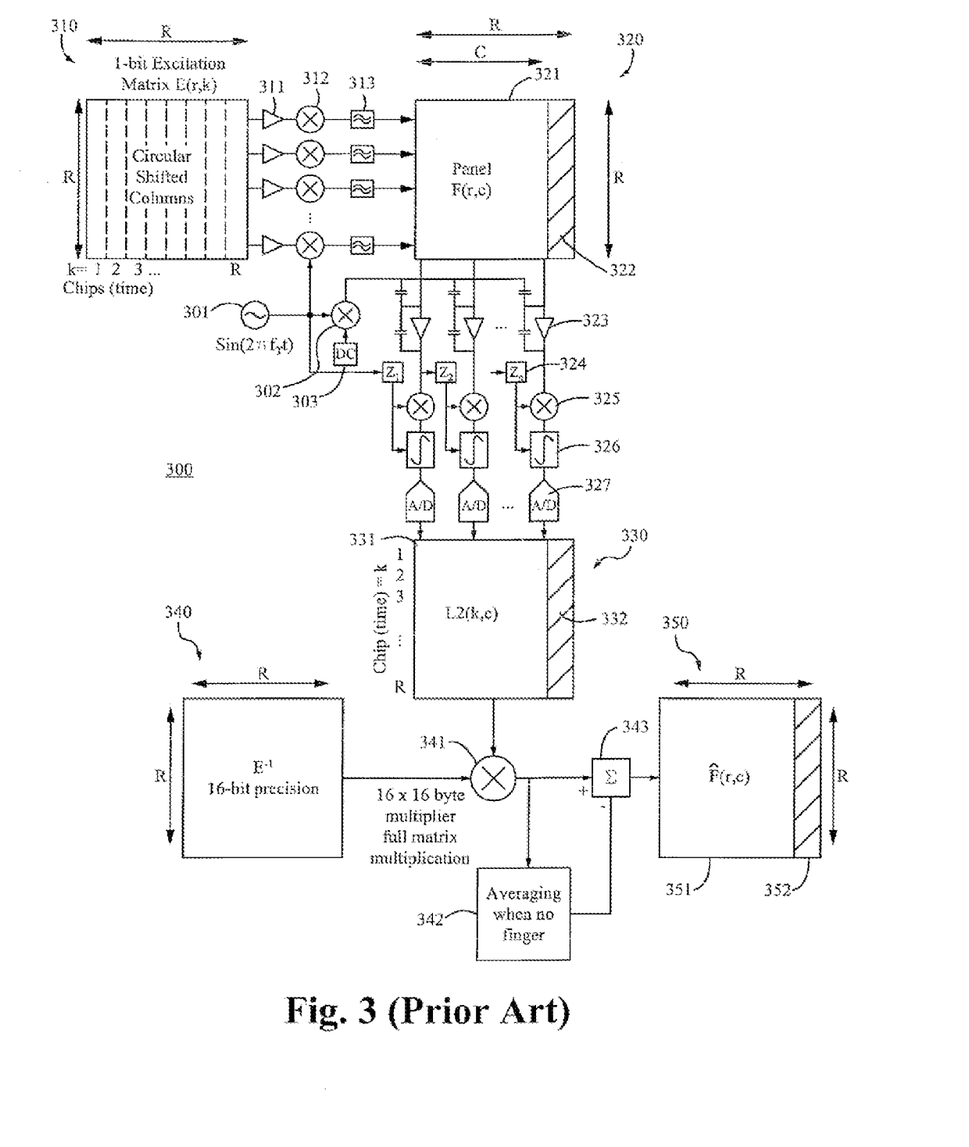
FIG. 3 illustrates key elements of a mutual capacitance touch panel decoding system as is known in the art.

FIG. 3 illustrates key elements of a mutual capacitance touch panel decoding system 300 as is known in the art. An excitation matrix 310 comprises 1-bit coefficients for each of R rows and R columns. A column of coefficients is used to drive R amplifiers 311 that are coupled to R passive multipliers 312, corresponding to each of the drive channels of a touch panel 321. A sine signal 301, such as a 100 KHz sine, is coupled to the passive multipliers 312. The output of each passive multiplier 312 is filtered by a filter 313 and is output by the filter 313 to a drive channel of the touch panel 321. The output of each sense channel of the touch panel 321 is coupled to a low-noise amplifier (LNA) 323. The sine signal 301 is also multiplied by a passive multiplier 302 with a DC offset voltage 303 and fed to the LNAs 323 to offset the output of the each sense channel to near zero at each LNA 323 when no touch is upon the panel. As the drive signals propagate across and down the panel to the sense channels, there is a delay in an output signal being received at the LNAs 323. The delay increases as the column number increases from left to right across the touch panel 320. To compensate for this delay, a fixed delay 324, varying by column, $Z_1, Z_2, Z_3 \ldots Z_n$ is applied to the output of the LNAs 323. The sine signal 301 is multiplied with a delay 324 and a signal output from an LNA 323 by a passive multiplier 325, and then is passed into an integrator 326 for each column output. The output of each integrator 326 is converted to a digital value at an analog to digital convertor 327 and stored into a matrix of voltage values 330 for the rows and columns of the touch panel 321. The matrix of voltage values 330 is multiplied by an inverse matrix 340 of the excitation matrix 310, using a 16-bit×16-bit full matrix multiplier 341. The resulting capacitance values are averaged 342 when no touch is present on the touch panel, and summed 343 to form a resulting matrix of capacitance values 350 from which the coordinates of a touch upon the touch panel 321 are determined.

Figure 4A:
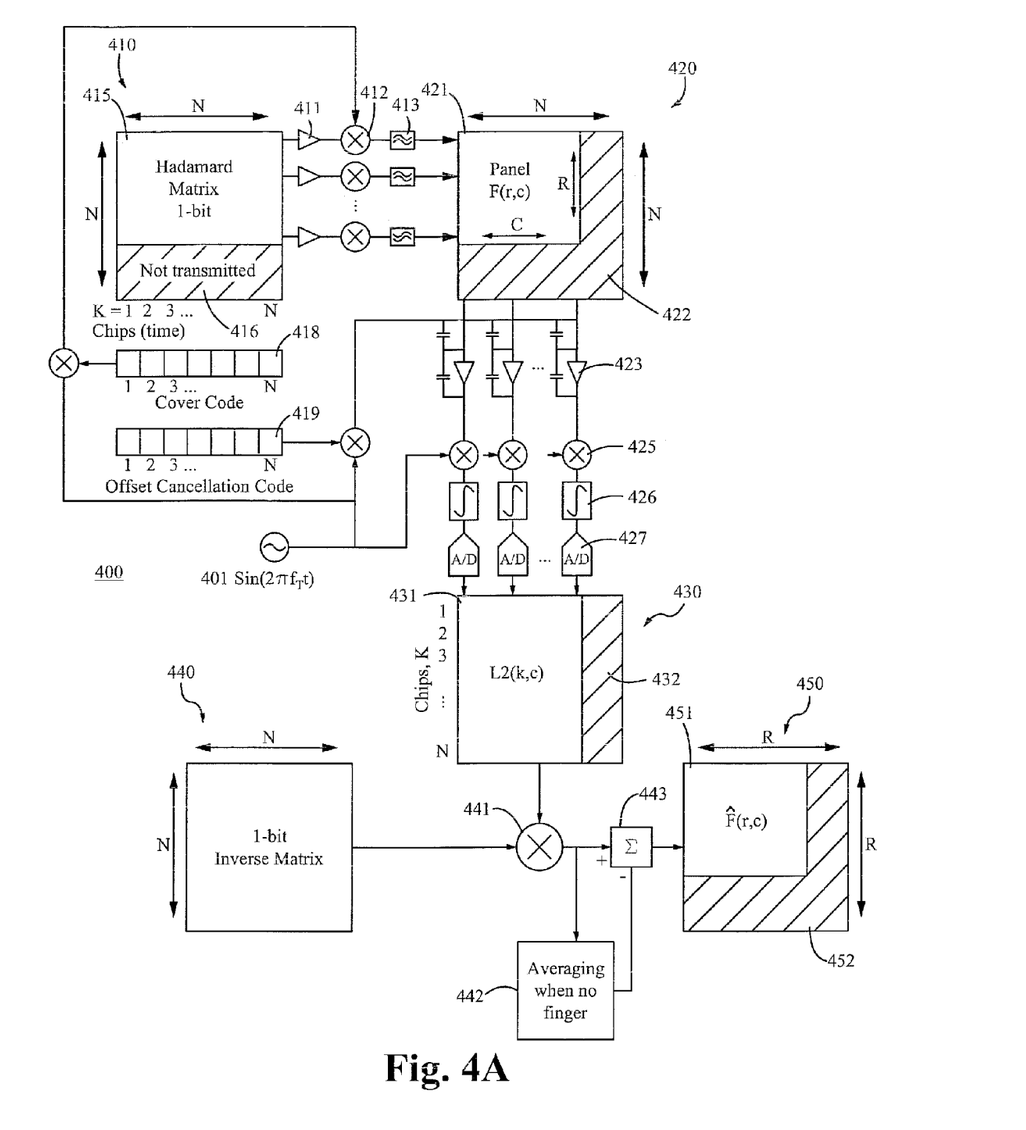
FIG. 4A illustrates a touch panel decoding circuit using a Hadamard excitation matrix according to some embodiments of the present invention.

FIG. 4A illustrates key elements of a mutual capacitance touch panel decoding system 400 in accordance with some embodiments of the presently-claimed invention. An excitation matrix 410 comprises a Hadamard matrix 415 of order N. An example touch panel 421 has 18 drive channels and 16 sense columns. The order, N, of the excitation matrix 415 is greater than or equal to the larger of the number of drive channels (here, 18), and the number of sense columns (here, 16). A Hadamard matrix has order 1, 2, or 4$k$ where k is an integer greater than zero. In FIG. 4A, the lowest order, N, for a Hadamard excitation matrix 415 meeting the foregoing criteria is N=20. For each column, $C_i$, of the Hadamard excitation matrix 415, the column is selected, each drive signal is fed to an amplifier 411, and the amplified selected column is multiplied by a cover code 418, mixed with a sine wave 401 such as a 100 KHz sine, to produce a drive signal for each of the drive channels of the touch panel 421. Each drive signal is filtered by a filter 413 before feeding the drive signal to a drive channel of the touch panel 421. The cover code 418 is a vector of order N. In other embodiments, the cover code 418 is an N×N matrix wherein each column, i, of the cover code 418 is multiplied by the corresponding column, i, of the Hadamard matrix 415. As described more fully, below, the coefficients of the cover code are able to be 1-bit values, integers, real values, or complex values. An offset cancellation code, 419, is multiplied by the sine wave 401, and is fed to the each column sense channel to reduce variance between the outputs of the sense channels at the sense channel amplifiers 423. In other embodiments, the offset cancellation matrix is an N×N matrix wherein each column, i, of the offset cancellation code 419, offsets the output of the column sense channels at each time interval, i, thereby providing a time-varying offset to the output of the column sense channels.

For the example touch panel 421, there are 18 drive channels and the Hadamard excitation matrix 415 has order 20. Thus, each selected column of the Hadamard excitation matrix 415 has 20 coefficients. The last two coefficients 416 of a selected column of the Hadamard excitation matrix 415 are not transmitted to the touch panel 421 because there is no corresponding drive channel, e.g. 19 and 20, on the touch panel 421. Conceptually, the physical touch panel 421 exists within an N×N matrix having null values 422 for rows greater than the touch panel 421 (here, rows 19 and 20) and null values 422 for columns greater than the touch panel 421 (here, columns 17 through 20). Each column sense is input to an amplifier 423, mixed with the sine wave 401, integrated 426, then dumped to an analog to digital convertor 427. Resulting digital values are stored in a matrix of voltages 431. A fixed delay (not shown) is able to be added to each sense line to reduce phase shift in the drive signal propagation to the sense line. The fixed delay is able to be different for each sense line. The matrix of voltages 431 has null vales 432 for the coefficients of row numbers greater than the touch panel 421 (here, rows 19 and 20) and null values 432 for the coefficients of column numbers greater than the touch panel 421 (here, columns 17 through 20). The matrix of voltages 431 is multiplied 441 by the inverse matrix 440 of the Hadamard excitation matrix 415 to obtain a matrix of panel capacitance values 451 at each drive channel and column sense intersection. When no touch is detected upon the panel, the coefficients of the capacitance matrix 451 are averaged 442 to filter out anomalies, then the averaged coefficients are used by summation/difference element 443 to determine a final matrix of capacitances 451 in an N×N matrix 450. Alternatively, or in addition, to using averaging 442, a baseline phase-compensated matrix of capacitances (not shown) representing no touch upon the touch panel 421 is able to be used to determine when no touch is upon the touch panel 421. In addition, averaging 442 can be combined with the baseline phase-compensated matrix of capacitances (not shown) to further reduce error phase shift error in the matrix of capacitance values 451. The baseline phase compensated matrix (not shown) is able to be established as a function of the model of the touch panel 421, as a part of a power-up sequence of a device incorporating the touch panel 421 and decoder circuit 400, or as a part of a factory test sequence. Coefficients of the N×N matrix 450 corresponding to rows that are greater than the number of rows in the touch panel 421 have null values 452. Coefficients of the N×N matrix 450 corresponding to columns that are greater than the number of columns in the touch panel have null values 452.

Figure 4B:
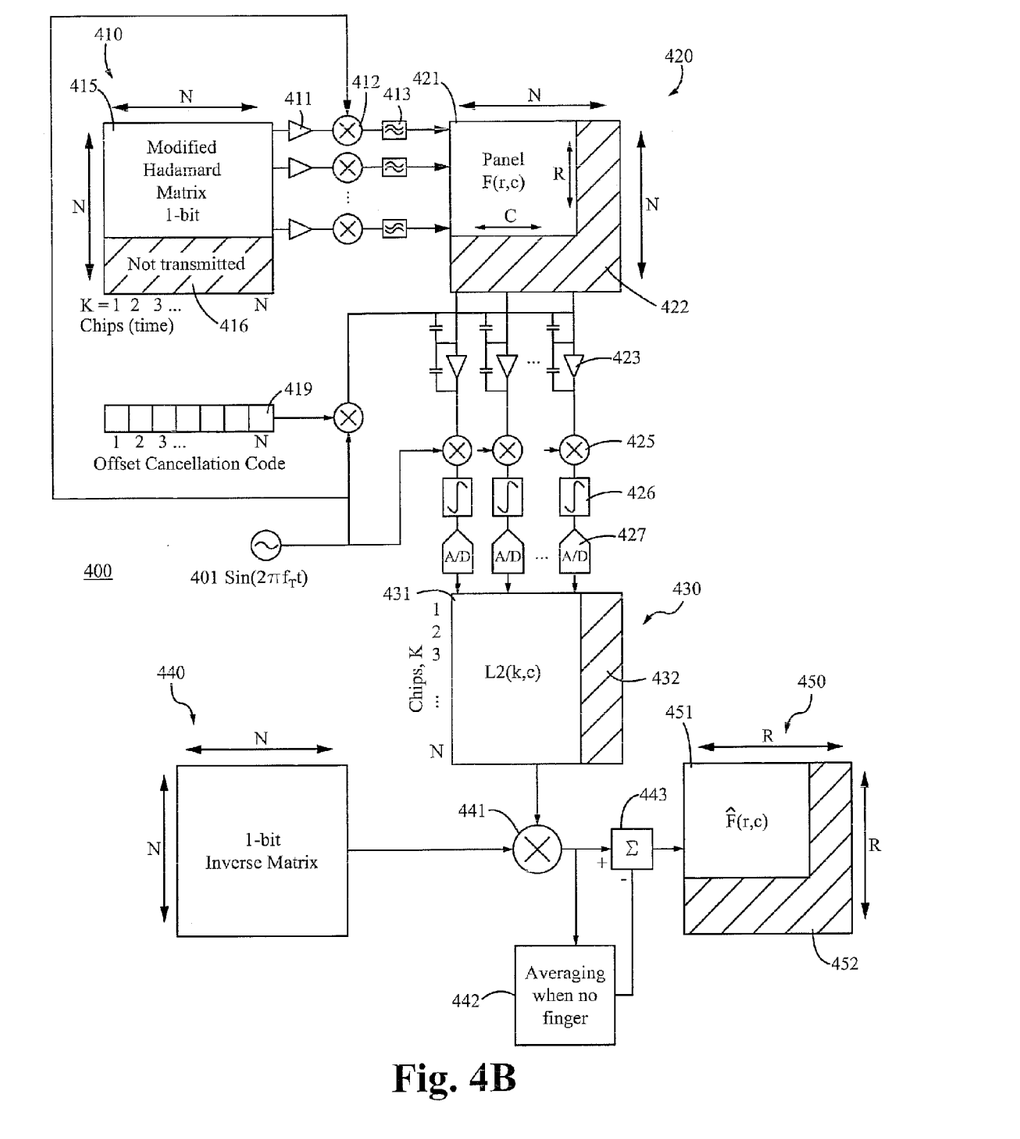
FIG. 4B illustrates a touch panel decoding circuit using a Hadamard excitation matrix and an Offset Cancellation Code according to some embodiments of the present invention.

FIG. 4B illustrates a touch panel decoding circuit using a Hadamard excitation matrix and an Offset Cancellation Code according to some embodiments of the present invention. FIG. 4B is a modification to FIG. 4A utilizing a Modified Hadamard Matrix as an excitation matrix. As described below, a Modified Hadamard Matrix can comprise an excitation matrix wherein a row and/or a column of the Hadamard matrix has been discarded. Alternatively, or in addition, a Modified Hadamard excitation Matrix can comprise a Hadamard matrix wherein the columns of the Hadamard matrix have been pre-multiplied by a cover code. The cover code can be a constant cover code for all columns of the Hadamard matrix, or a distinct cover code is multiplied by each column of the Hadamard matrix. A Walsh code matrix can alternatively be used in place of the Modified Hadamard Matrix.

Figure 5A:
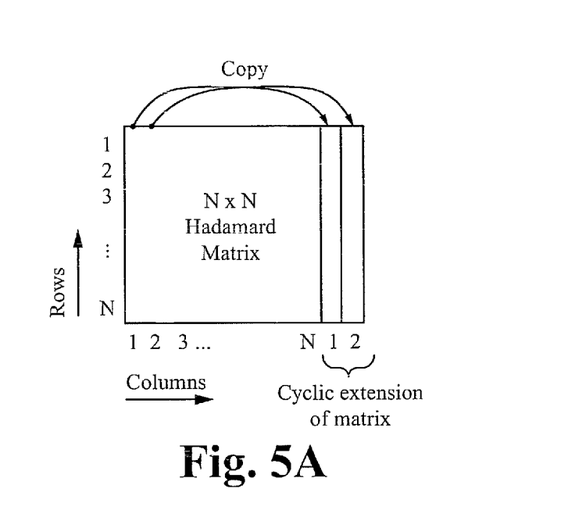
FIG. 5A illustrates cyclic extension of excitation during a scan for decoding a touch panel according to some embodiments of the present invention.

FIG. 5A illustrates cyclic extension of excitation during a scan for decoding a touch panel according to some embodiments of the present invention. An excitation matrix, E, is an N×N Hadamard matrix. As shown in timing diagram 600, in FIG. 6, below, each column $C_i$, i=1 to N, of the excitation matrix is selected for driving the drive channels of a touch panel. After $C_N$ has been selected and used for driving the drive channels, column $C_1$ is selected and used, then column $C_2$ is selected and used for driving the drive channels. The additional selection and use of $C_1$ and $C_2$ is a cyclic extension of the excitation of the drive channels. The cyclic extension of excitation allows decoding of a scan due to signal propagation delay from the drive channels to the sense channels. The cyclic extension of excitation is enabled by the orthogonality of the Hadamard excitation matrix.

Figure 5B:
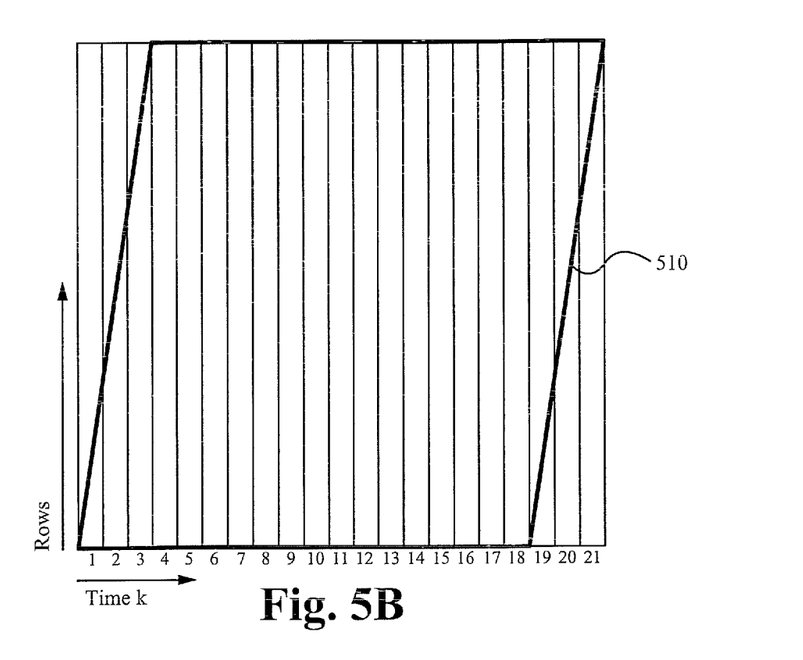
FIG. 5B illustrates phase shift of excitation voltages to sense channels during a scan for decoding a touch panel.

FIG. 5B illustrates phase shift 510 of excitation voltages to sense channels during a scan of a touch panel for decoding a touch upon the touch panel.

Figure 6:
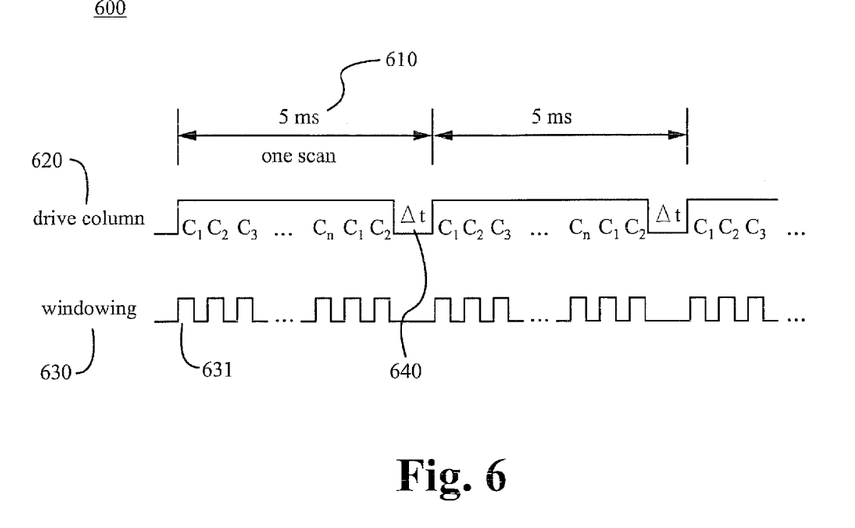
FIG. 6 illustrates a timing of a scan according to some embodiments of the invention.
Figure 7:
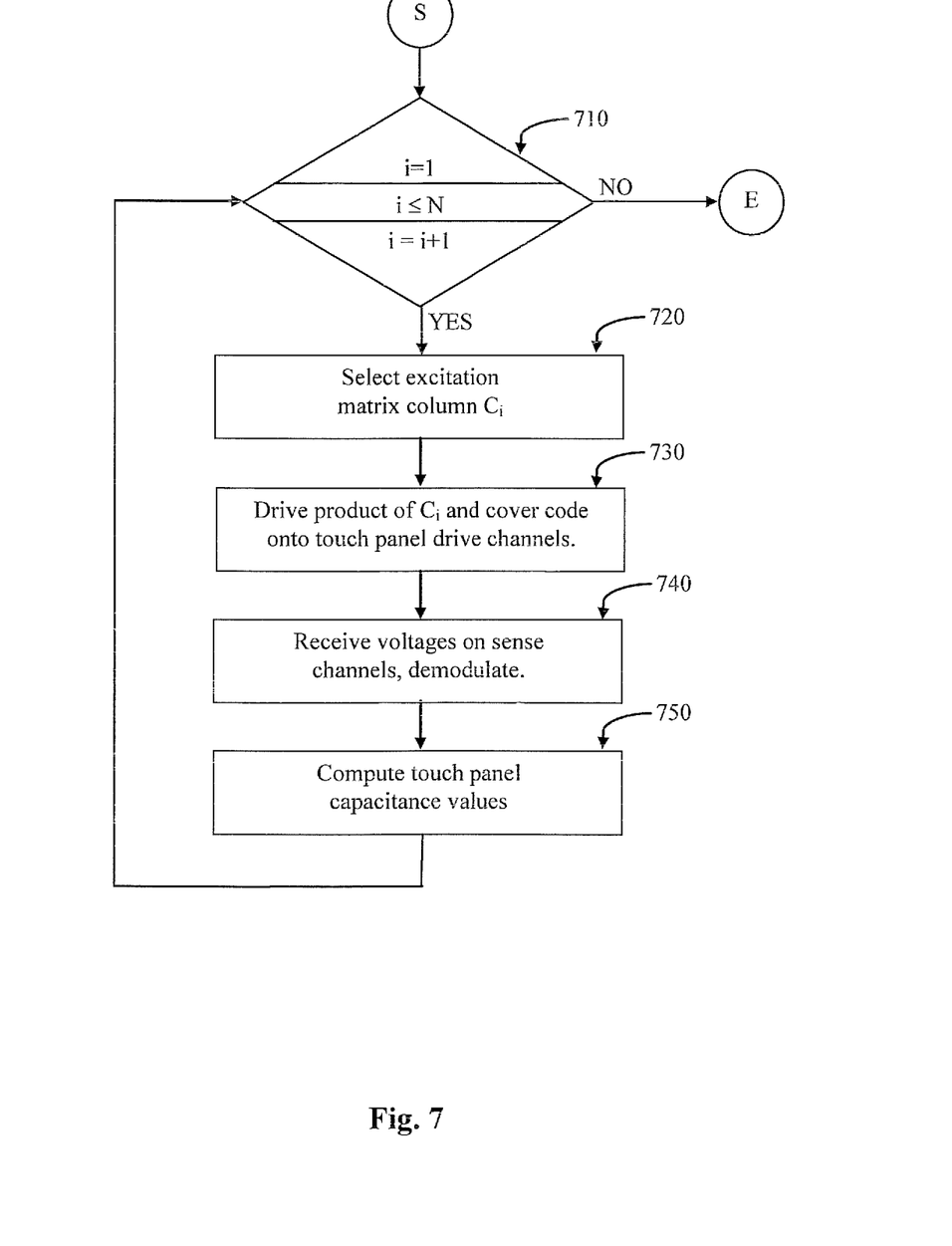
FIG. 7 illustrates a method of scanning a touch panel to decode the location of a touch upon the touch panel according to some embodiments of the presently-claimed invention

FIG. 6 is a timing diagram 600 of a scan of a touch panel in accordance with an embodiment of the invention. A touch panel decoding circuit comprises a scan rate at which a method of scanning the touch panel, such as in FIG. 7, is performed. In this embodiment, a representative scan rate is 200 Hz, or 5 msec per scan (610). A representative touch panel has 20 drive channels. A suitable excitation matrix, E, is a Hadamard matrix having 20 columns of 20 coefficients each. During one 5 msec scan, each column $C_i$, i=1 to 20, of the excitation matrix E is selected and a product of $C_i$ and a cover code having 20 coefficients is used to generate 20 drive signals, one to each of the 20 drive channels of the touch panel. The selection of each of the 20 drive columns is shown as $C_1, C_2, C_3 \ldots C_N$. After the selection of $C_{20}$ (shown as $C_N$), the column $C_1$ is selected, driven, and demodulated, and the column $C_2$ is selected, driven, and demodulated. The additional two excitation steps in the scan comprise a "Cyclic Extension of Excitation" that accounts for the phase shift shown in FIGS. 5A and 5B. A windowing pulse 630 is used to reduce inter-code interference. Although a square wave 631 is shown, one skilled in the art will recognize that other windowing pulse shapes can be used. An inter-scan delay time, Δt (640), is inserted to reduce interference between scans. At a 200 Hz scan rate, a suitable inter-scan delay Δt is able to be in the range of 150 μsec to 250 μsec.

FIG. 7 illustrates the steps 700 of a method of scanning a touch panel to decode the location of a touch upon the touch panel. At step 710, a loop counter is initialized to i=1, tested to determine whether i is less than or equal to the maximum number of columns, N, in the excitation matrix, E. If i is less than or equal to N, then i is incremented and the method step 720 is performed. If i is greater than N, then the method ends. At step 720, column $C_i$ of the excitation matrix is selected. At step 730, a product of column Ci and a cover code having the same order as $C_i$ is computed and driven to the touch panel drive channels. At step 740, voltages are received at the touch panel sense channels and are demodulated. At step 750, the capacitances corresponding to the voltages received at the sense channels are computed from a matrix, $E^{-1}$, that is the inverse of the excitation matrix, E.

Cover Code

Using a Hadamard excitation matrix, the resulting voltages received at the touch panel sense channels can vary substantially. In accordance with the presently-claimed invention, a cover code is used to reduce the variance between voltages received at the sense channels. A cover code can be a constant vector of M coefficients, or an M×M matrix of coefficients for a touch panel having M drive channels. For each time interval, i, a column $E_i$ of the Hadamard excitation matrix E is multiplied by the cover code matrix column, $CC_i$. The coefficients of the cover code, CC, are chosen such that the variance in output voltages, V, received at the sense channels of the touch panel, is minimized when there is no touch upon the touch panel. This property of the cover code enables the use of low noise amplifiers (LNAs) at the sense channels that have smaller dynamic range over the prior art. The benefit of LNAs with a smaller dynamic range is that the LNAs of the presently-claimed invention can be lower cost, smaller, use less power, generate less heat, and require fewer bits in an associated analog to digital converter over the prior art.

For a vector cover code, or for each column of a matrix cover code column, $CC_i$, the coefficients are able to be a vector of 0's and 1's encoded as a single binary value that is logically ANDed with a selected column, $E_i$, of a Hadamard excitation matrix, E, to generate drive signals to the touch panel drive channels. To further reduce the dynamic range of the LNAs, the cover code is able to be real-valued, complex-valued, or a combination thereof. A software tool such as a MATLAB™ software tool is able to be used to determine the values of a suitable cover code. In some embodiments, the cover code is an array having R number of rows and N number of columns, where in R is the order of the excitation matrix, E, and N is the number of sense channels in the touch panel.

A MATLAB™ programming code for computing a matrix cover code is shown in Table 1, below.

TABLE 1

```
clear all;clc;
N=16;
h=hadamard(N);
covercode=zeros(N);
sum_max=1e6;
for ii=1:2^N-1,
    c=dec2bin(ii,N)';
    x(c=='1')=1;
    x(c=='0')=-1;
    xx=repmat(x',1,N);
    xh=xx.*h;
    maxval=max(abs(sum(xh)));
    if maxval<sum_max && maxval>0,
        sum_max=maxval;
        covercode=xx;
    end;
end;
covercode
sum(covercode.*h)
inverse_mat=inv(covercode.*h);
scale=max(max((inv(covercode.*h))))
inverse_mat/scale
cond(inverse_mat)
```

An exemplary 16×16 Hadamard excitation matrix, is shown below in Table 2, below.

TABLE 2

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | -1 | 1 | -1 | 1 | -1 | 1 | -1 | 1 | -1 | 1 | -1 | 1 | -1 | 1 | -1 |
| 1 | 1 | -1 | -1 | 1 | 1 | -1 | -1 | 1 | 1 | -1 | -1 | 1 | 1 | -1 | -1 |
| 1 | -1 | -1 | 1 | 1 | -1 | -1 | 1 | 1 | -1 | -1 | 1 | 1 | -1 | -1 | 1 |
| 1 | 1 | 1 | 1 | -1 | -1 | -1 | -1 | 1 | 1 | 1 | 1 | -1 | -1 | -1 | -1 |
| 1 | -1 | 1 | -1 | -1 | 1 | -1 | 1 | 1 | -1 | 1 | -1 | -1 | 1 | -1 | 1 |
| 1 | 1 | -1 | -1 | -1 | -1 | 1 | 1 | 1 | 1 | -1 | -1 | -1 | -1 | 1 | 1 |
| 1 | -1 | -1 | 1 | -1 | 1 | 1 | -1 | 1 | -1 | -1 | 1 | -1 | 1 | 1 | -1 |
| 1 | 1 | 1 | 1 | 1 | 1 | 1 | 1 | -1 | -1 | -1 | -1 | -1 | -1 | -1 | -1 |
| 1 | -1 | 1 | -1 | 1 | -1 | 1 | -1 | -1 | 1 | -1 | 1 | -1 | 1 | -1 | 1 |
| 1 | 1 | -1 | -1 | 1 | 1 | -1 | -1 | -1 | -1 | 1 | 1 | -1 | -1 | 1 | 1 |
| 1 | -1 | -1 | 1 | 1 | -1 | -1 | 1 | -1 | 1 | 1 | -1 | -1 | 1 | 1 | -1 |
| 1 | 1 | 1 | 1 | -1 | -1 | -1 | -1 | -1 | -1 | -1 | -1 | 1 | 1 | 1 | 1 |
| 1 | -1 | 1 | -1 | -1 | 1 | -1 | 1 | -1 | 1 | -1 | 1 | 1 | -1 | 1 | -1 |
| 1 | 1 | -1 | -1 | -1 | -1 | 1 | 1 | -1 | -1 | 1 | 1 | 1 | 1 | -1 | -1 |
| 1 | -1 | -1 | 1 | -1 | 1 | 1 | -1 | -1 | 1 | 1 | -1 | 1 | -1 | -1 | 1 |

An exemplary 16×16 Cover Code matrix is shown below in Table 3.

TABLE 3

| -1 | -1 | -1 | -1 | -1 | -1 | -1 | -1 | -1 | -1 | -1 | -1 | -1 | -1 | -1 | -1 |
|---|---|---|---|---|---|---|---|---|---|---|---|---|---|---|---|
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |

As can be seen from the sum of each column of the 16×16 Hadamard matrix, a particular column has a maximum absolute value of 16. After multiplying with the cover code matrix, the maximum absolute value is reduced to 4. Using a complex cover code can further reduce the maximum absolute value. The condition number of the Hadamard excitation matrix is not affected by the cover code and is maintained at 1. In the case when all N rows of the Hadamard excitation matrix, E, are not used for a particular touch panel, the search for the cover code is done by looking for the minimum (absolute (sum of column)) over the non-zero rows. The entries for the unused rows are "+1" in the cover code for the inverse matrix computation, $E^{-1}$.

In some embodiments, the sine drive, 401 in FIG. 4A, is able to be shifted by 0° and 180° thereby using Binary Phase Shift Keying (BPSK) modulation to ensure that the output voltages at the sense channels are substantially the same. In embodiments wherein the cover code values are complex values, the sine drive, 401 in FIG. 4A, is able to be shifted by 0°, 90°, 180° and 270° for each row-drive period, i, thereby using Quadrature Phase Shift Keying (QPSK) modulation to further ensure that the output voltages at the sense channels are substantially the same.

Modified Hadamard Matrix, Other Excitation Matrices

In some embodiments, a modified Hadamard matrix is able to be used as an excitation matrix. The first column and first row of a Hadamard matrix are discarded and the resulting modified Hadamard matrix is used as an excitation matrix, E. The modified Hadamard matrix is invertible, although not orthogonal. An inverse modified Hadamard matrix, $E^{-1}$, has 1 to 4-bit coefficients and thus requires less storage over the prior art. A suitable cover code, as described above, is able to be used in combination with a modified Hadamard excitation matrix.

Another form of modified Hadamard matrix, $H_M$, is found by $H_M = E \cdot CC$. The modified Hadamard excitation matrix, $H_M$, is the dot product of a Hadamard excitation matrix, E, and a constant cover code, CC. CC is chosen to minimize the variance in output voltages between column sense channels. As described below, an Offset Cancellation Code, either constant or time-varying per column sense channel, can be used to further minimize or eliminate the variance in output voltages between column sense channels.

Yet another suitable excitation matrix that can be used in spread spectrum signal processing is a Walsh matrix. A Walsh matrix has an order that is a power of two and coefficients that are +1 or −1. The dot product of any two rows of a Walsh matrix is zero. A Walsh matrix has the property that every row is orthogonal to, and the logical NOT of, every other (alternate) row.

Offset Cancellation Code

Using a Modified Hadamard excitation matrix, as described above, to drive the sense lines of a touch panel, the resulting voltages received at the touch panel sense channels can vary substantially. An Offset Cancellation Code can be applied to the touch panel sense channels to reduce the variance between sense channels. The Offset Cancellation Code is a time-varying code sequence equal to the negative of the sum of a column sense channel sum at east time interval. In some embodiments, each column sense channel has an Offset Cancellation Code. Such an embodiment minimizes the variance between output sense channels but requires more memory using a single Offset Cancellation Code for all channels. A MATLAB™ programming code for computing a time-varying Offset Cancellation Code for each column sense channel is recited in Table 4, below.

TABLE 4

```
clear all;clc;
N=16;
h=hadamard(N);
covercode=zeros(N);
sum_max=1e6;
for ii=1:2^N-1,
    c=dec2bin(ii,N)';
    x(c =='1')=1;
    x(c =='0')=-1;
    xx=repmat(x',1,N);
    xh=xx.*h;
    maxval=max(abs(sum(xh)));
    if maxval<sum_max && maxval>0,
       sum_max=maxval;
       covercode=xx;
    end;
end;
covercode
Exct=covercode.*h;
sum_cc=sum(covercode.*h)
inverse_mat=inv(covercode.*h);
scale=max(max((inv(covercode.*h))))
inverse_mat/scale
cond(inverse_mat)
%% Decoding without Offset Cancellation
if false,
    [F1,F2]=meshgrid(1:N,1:N);
    F=ones(N)+(F1+F2-1)*0.001 % this is sloped panel profile F
    L=zeros(N);
    for ii=1:N,
       L(ii,:)=sum(F.*repmat(Exct(:,ii),1,N)); % received A/D signal
    end;
    Finger_BL=inv(Exct')*L
end
%% Decoding with Offset Cancellation
if true
    [F1,F2]=meshgrid(1:N,1:N);
    F=ones(N)+(F1+F2-1)*0.001 % this is sloped panel profile F
    L=zeros(N);
    for ii=1:N,
       L(ii,:)=sum(F.*repmat(Exct(:,ii),1,N)); % propagate Excitation
signal over full panel at a given chip interval ii
%       L(ii,:)=L(ii,:)-sum(L(ii,1)); % offset cancellation
including panel variation compensation
       L(ii,:)=L(ii,:)-sum(repmat(Exct(:,ii),1,N)); % offset
cancellation without compensating panel variation
    end;
    L
    offset_matrix=-repmat(sum_cc,N,1)'
    % L=L+offset_matrix; % already performed above at each chip
interval
    Finger_BL=inv(Exct')*L
end
```

The present invention can be provided as a circuit, a programmable controller, a single integrated circuit, a field programmable gate array (FPGA), any combination thereof, or other suitable form as is known in the art.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made to the embodiments chosen for illustration without departing from the spirit and scope of the invention as defined by the appended claims.

What is claimed is:

1. A method of decoding a touch upon a touch panel, by a touch panel decoding circuit coupled to the touch panel, the touch panel comprising M drive channels and N sense channels, the method comprising a scan of the touch panel, a scan comprising the steps, for each column $C_i$ of an excitation matrix E, and i=1 to N:

a. generating a product of $C_i$ and a cover code, the cover code comprising a matrix, CC, having M rows and N columns, where generating the product of $C_i$ and the cover code comprises generating the product of $C_i$ and the $i^{th}$ column, $CC_i$, of the cover code matrix, and where coefficients of the cover code comprise at least one of real-values, complex values, or a value that is one of $-1$, $+1$, and 0;
   b. driving the M drive channels with M drive signals generated by the product of $C_i$ and the cover code; and
   c. receiving and demodulating the N sense channels to form an M×N matrix of touch panel decoding data, wherein the demodulating is performed using the inverse matrix, $E^{-1}$, of the excitation matrix, E.

2. The method of claim 1, after performing the scan, further performing steps (a) through (c) using column $C_1$ prior to beginning a next scan in accordance with the method of claim 1.

3. The method of claim 1, wherein the coefficients of the excitation matrix, E, each have a value that is one of $-1$, $+1$, and 0.

4. The method of claim 3, further comprising encoding each column, $C_i$, of the excitation matrix, E, as a selectable binary value.

5. The method of claim 1, wherein computing the product of $C_i$ and the cover code comprises performing a logical AND of the column $C_i$ and the cover code.

6. The method of claim 1, wherein the excitation matrix, E, is orthogonal.

7. The method of claim 1, wherein the excitation matrix, E, is a Hadamard matrix such that the order of E is greater than or equal to the larger of M and N.

8. The method of claim 1, wherein the coefficients of the cover code each have a value that is one of $-1$, $+1$, and 0.

9. The method of claim 1, further comprising encoding the cover code as a binary value.

10. The method of claim 1, wherein the coefficients of the cover code comprise real-values.

11. The method of claim 1, wherein the coefficients of the cover code comprise complex-values.

12. The method of claim 1, further comprising injecting an offset voltage to the output of each sense channel such that the variance between the voltage outputs at all sense channels is minimized when no touch is made upon the touch panel.

13. The method of claim 12, wherein injecting an offset voltage to the output of each sense channel comprises injecting a voltage that varies with the selection of the $i^{th}$ excitation matrix column, $C_i$.

14. The method of claim 12, wherein injecting an offset voltage comprises injecting a constant voltage for all sense channels.

15. The method of claim 12, wherein injecting an offset voltage comprises injecting the offset voltage after a sense channel amplifier and before a sense channel integrator.

16. A touch panel decoding circuit configured to be coupled to a touch panel, the touch panel having M drive channels and N sense channels, the decoding circuit comprising:

a. an invertible excitation matrix, E, comprising at least N selectable columns, $C_i$, i=1 to N, each having at least M coefficients; and
   b. a cover code configured to be logically coupled to a selected one of the at least N selectable columns of the excitation matrix E, such that a product of the selected column and the cover code is configured to provide a drive signal to each of the M drive channels, the cover code comprising a matrix, CC, having M rows and N columns, where the product of the selected column, $C_j$, and the cover code comprises the product of $C_j$ and the $i^{th}$ column, $CC_j$, of the cover code matrix, and where coefficients of the cover code comprise at least one of real-values, complex values, or a value that is one of −1, +1, and 0.

17. The touch panel decoding circuit of claim 16, wherein the coefficients of the excitation matrix, E, each have a value that is one of −1, +1, and 0.

18. The touch panel decoding circuit of claim 16, wherein the excitation matrix, E, is orthogonal.

19. The touch panel decoding circuit of claim 16, wherein the excitation matrix E is a Hadamard matrix of order greater than or equal to the larger of M and N.

20. The touch panel decoding circuit of claim 19, further comprising a decoding matrix, $E^{-1}$, and the decoding matrix $E^{-1}$ is the same as the excitation matrix E.

21. The touch panel decoding circuit of claim 20, wherein only one instance of the excitation matrix E is encoded in the touch panel decoding circuit, and the one instance is also used as the decoding matrix, $E^{-1}$.

22. The touch panel decoding circuit of claim 16, wherein the coefficients of the cover code comprise real-values.

23. The touch panel decoding circuit of claim 16, wherein the coefficients of the cover code comprise complex-values.

24. The touch panel decoding circuit of claim 16, wherein the coefficients of the cover code each have a value that is one of −1, +1, and 0.

25. The touch panel decoding circuit of claim 16, further comprising a memory wherein each column, $C_j$, of the at least N columns of the excitation matrix E is encoded as a binary value in the memory.

26. The touch panel decoding circuit of claim 16, further comprising a voltage injection circuit coupled to the output of each sense channel such that the variance between the voltage outputs at all sense channels is minimized when no touch is made upon the touch panel.

27. The touch panel decoding circuit of claim 26, wherein the voltage injection circuit is coupled to the output of each sense channel at a point on each sense channel after an amplifier and before an integrator.

28. The touch panel decoding circuit of claim 26, wherein injecting an offset voltage comprises injecting a constant voltage for all sense channels.

29. The touch panel decoding circuit of claim 16, further comprising mixing each of the M drive signals with a shaping pulse.

\* \* \* \* \*